Aug. 13, 1940.　　　　F. BISZANTZ　　　　2,211,195
TAIL GATE HOOK
Filed June 20, 1938　　　2 Sheets-Sheet 1
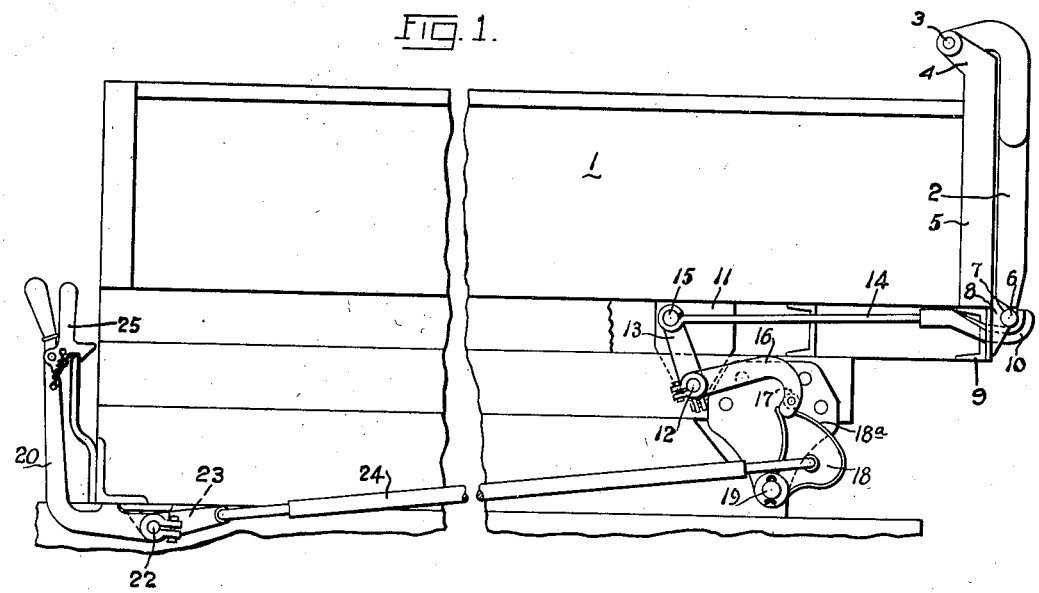
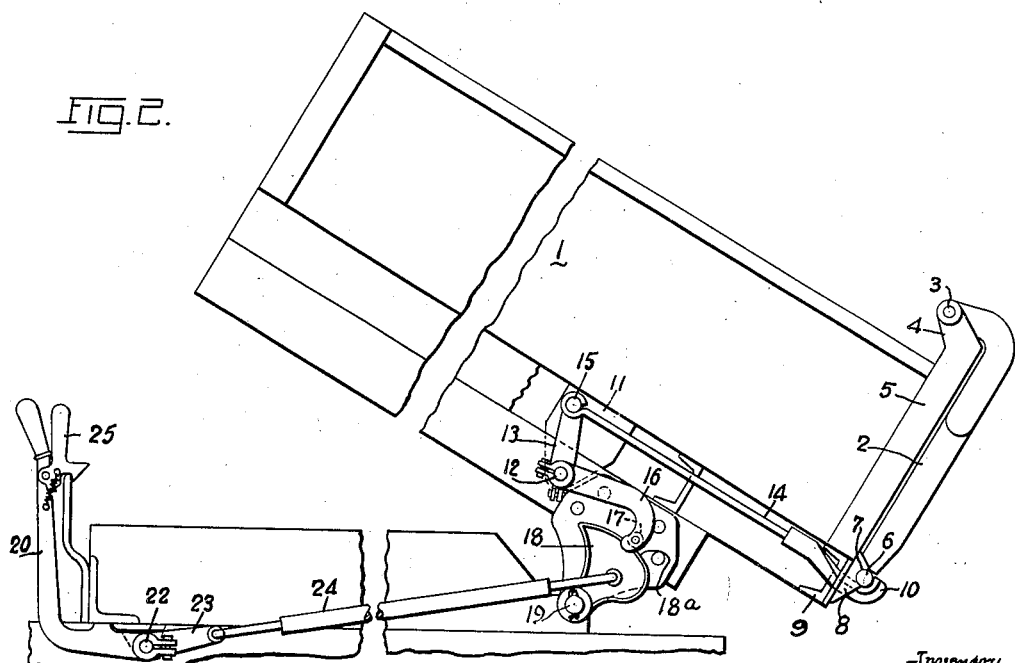
Inventor
FRED BISZANTZ,
By Toulmin & Toulmin
Attorneys Aug. 13, 1940.   F. BISZANTZ   2,211,195
TAIL GATE HOOK
Filed June 20, 1938   2 Sheets-Sheet 2
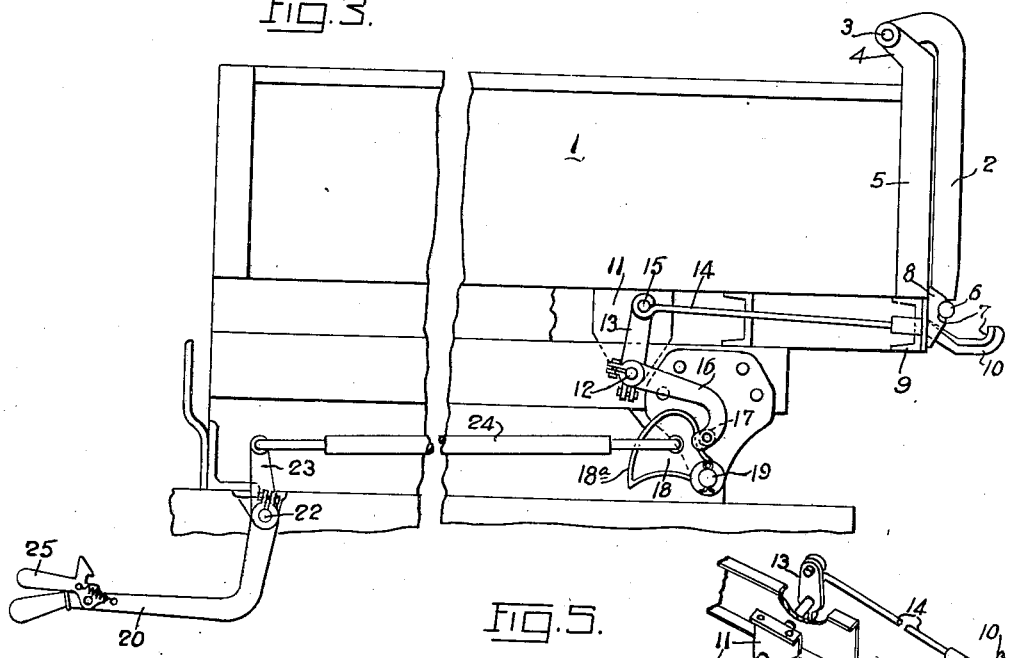
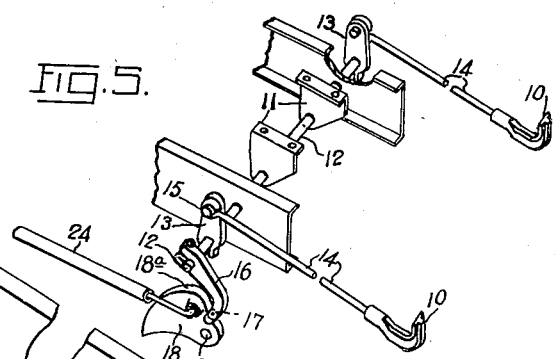
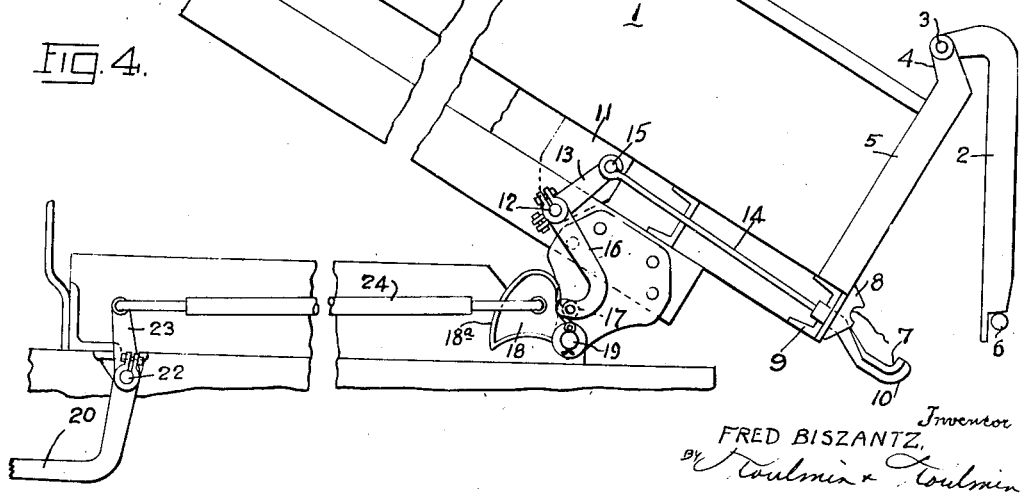
Inventor
FRED BISZANTZ,
By Toulmin & Toulmin
Attorneys Patented Aug. 13, 1940

2,211,195

UNITED STATES PATENT OFFICE 2,211,195

TAIL GATE HOOK

Fred Biszantz, Galion, Ohio, assignor to The Galion Metallic Vault Company, Galion, Ohio, a corporation of Ohio Application June 20, 1938, Serial No. 214,685

10 Claims. (Cl. 298—23)

This invention relates to tail gate operating mechanisms and more particularly to a device for locking and unlocking tail gates on vehicles or the like.

An object of this invention is to provide a hook for locking gates or movable sections on a vehicle body so that during relative movement of the body the gate will be maintained closed until it is desired to be opened.

A particular object of this invention is to provide a hook for tail gates on dumping trucks, vehicles, wagons, rail cars and the like, where the body of the vehicle is to be tilted or hoisted on the chassis for discharging its contents.

Another object of this invention is to provide a mechanism for operating tail gates which by one setting the tail gate will be locked shut during tilting of the body and in another position the tail gate will be maintained unlocked during hoisting and lowering of the body on the chassis.

Another object is to provide a novel reciprocating hook member for locking the tail gate in closed position.

Another object is to provide a lever means for operating the tail gate hook which is fastened to the hoist subframe of the dumping vehicle.

Referring to the drawings:

Figure 1 is a side elevation view of the tail gate hook of this invention mounted on a dump truck body;

Figure 2 is a side elevation view of the truck body of Figure 1, showing the position of the locking mechanism when the truck body is in hoisted position;

Figures 3 and 4 are similar side elevation views of the dump truck body, showing the position of the tail gate hook and lever operating mechanism when the body is in horizontal and tilted positions respectively;

Figure 5 is a view in perspective of the tail gate hooks and operating mechanism.

Referring to the drawings in detail, wherein like references indicate similar parts throughout the drawings, 1 is a dump truck body having a hinged tail gate 2 which is mounted to swing outward about the pivot 3 secured near the top of the rearward extending flange member 4 on the posts 5. The bottom of the tail gate terminates in the form of a rod or bar 6 which fits into the grooves 7 of plates 8. The plates 8 are attached to the opposite ends of the truck body support 9.

The reciprocating hooks 10 are adapted to engage and hold the bottom rod portion 6 of the gate 2 in the grooves 7 of the plates 8. There are two hooks provided, one on each side of the tail gate, as illustrated in Figure 5.

Brackets 11 are spacedly mounted on the truck body frame and are arranged to rotatably support the rod 12. Rotation of the rod 12 is adapted to reciprocate the tail gate hooks 10. The operative mechanism for actuating each of the hooks comprises a lever 13 which is fixedly attached to the rod 12. Pivotably attached to the other end of the lever 13 is a connecting rod member 14 which is fastened at its outer end to the tail gate hook member 10. Movement of the shaft 12 rocks the members 13 and reciprocates the hooks 10. For controlling the rotation of the shaft or rod 12, there is fixed thereto a curved lever 16 having a roller 17 on its outer end which engages the cam member 18 along the surface portion 18a.

The cam 18 is loosely mounted on the rod 19 about which the body of the truck or vehicle pivots when it is tilted in a manner to discharge its contents, as shown in Figures 2 and 4. Cam 18 is tilted forward and backward by the hand lever 20, mounted on the front of the hoist subframe of the dump truck as illustrated on the drawings. The lever and cam are connected by means of the tumbling shaft 22, lever 23 and rod 24. Hand lever 20 is provided with a spring latch 25 for fastening the lever 20 in position to lock the tail gate closed, as illustrated in Figure 1.

In operation it will be understood that by moving the hand lever 20 forward the cam member 18 will be tilted forward, unlocking the tail gate hooks 10 with the body in any position. Likewise when the lever 20 is latched back in the position shown in Figure 1 the gate remains locked in closed position during the 50 degrees of travel of the body, because the roller 17 rides on a portion of the cam face 18a, the surface of which is at all points equidistant from the center of the shaft 19 on which the cam is mounted.

It will be understood that the lever mechanism for operating the tail gate hooks may be automatically controlled and that the cam and cooperating lever mechanism may be varied to accommodate the type of vehicle and degree of tilting of the dumping body.

The invention herein is not limited to the exact details of construction and operation disclosed, since obvious modifications within the scope of this invention may be made by persons skilled in the art.

Having thus fully described my invention, what I claim as new and desire to secure by Letters Patent is:

1. In combination, a dump body having a normally closed tail gate, means comprising hooks adapted to fasten said gate closed, lever means communicating with said hooks, and means comprising a cam movable by lever means attached thereto, said cam having surfaces coacting with said first mentioned lever to allow a relative movement therebetween in one position of the cam to prohibit movement of the hooks, while in another position of the cam providing free movement of the hooks to release the gate when the body is tilted for dumping.

2. A latch mechanism for dump body tail gates comprising a pivoted cam member, means including a lever for adjustably positioning said cam about its pivot, means comprising hooks reciprocable to fasten the tail gate closed, and lever mechanism connected to said hooks and coacting with said cam member for providing free movement of the hooks to release said gate at a certain angular tilt of the dump body.

3. A latch mechanism for dump body tail gates comprising a pivoted cam member, longitudinally reciprocable hook means for locking the gate against said body, means including a cam member and coacting lever mechanism communicating with said reciprocable hook means, and means for adjusting the position of said cam relative to said coacting lever mechanism to allow said gate to swing open when the body is tilted to a predetermined angle.

4. A latch mechanism for dump body tail gates comprising a pivoted cam member, longitudinally reciprocable hook means for locking the gate against said body, a bell crank lever means connected to said hook means, and means adjustably positioned for coacting with said bell crank lever mechanism, said last mentioned means being adapted to be positioned to coact with said lever mechanism to release said hook means and allow said gate to swing open when the dump body is tilted to a predetermined angle.

5. A latch mechanism for dump body tail gates comprising a pivoted cam member, longitudinally reciprocable hook means for locking the gate against said body, a bell crank lever mechanism connected to said hook means, means adjustably positioned for coacting with said bell crank lever mechanism, said last mentioned means being adapted to be positioned to coact with said lever mechanism to release said hook means and allow said gate to swing open when the dump body is tilted to a predetermined angle, and means comprising a lever connected to said adjustable means for changing its position.

6. In a mechanism for locking and unlocking dump body tail gates, a cam rotatably mounted on a shaft about which said dump body pivots, lever mechanism coacting with said cam for locking and unlocking said tail gate, and a lever pivoted to the subframe supporting said dump body remote from said cam member and mechanically connected therewith for adjustably positioning said cam whereby the gate is unlocked at a certain angular tilt of the body.

7. A latch mechanism for dump body tail gates comprising the combination of a plurality of hooks for engaging and holding the gate closed, means comprising coacting lever mechanism and cam means for actuating said hooks to lock and unlock the tail gate, a lever attached to the substructure of said dump body and connected to said cam member, said last mentioned lever being adapted by one adjustment to position said cam to allow said tail gate to open when the body is tilted a certain angular amount and by another setting to prohibit the gate from opening when the dump body is tilted.

8. In a dump body construction comprising a tail gate normally maintained closed, the combination of a hook adapted to be reciprocated to hold the gate closed, lever means attached to said hook, cam means coacting with said lever, and a hand lever attached to the subframe of said dump body and said cam for positioning the cam whereby said coacting lever will reciprocate said hook to lock and unlock said tail gate when the body is tilted for dumping.

9. In combination, a dump body having a normally closed tail gate, means comprising hooks reciprocable to fasten the tail gate closed, lever means connected to said hooks, means comprising a cam member coacting with said lever for providing free movement of the hooks to release said gate at a predetermined angular tilt of the dump body.

10. In combination, a dump body having a normally closed tail gate, means comprising longitudinally reciprocable hooks for fastening said gate closed, lever means connected with said hooks adapted to be actuated to reciprocate said hooks, means comprising a cam member coacting with said lever to allow movement of the hooks away from the gate in one position of the cam, said cam being adjustably positioned by a second lever attached to the sub-frame of the body for setting the cam in another position to prohibit movement of the hooks away from the tail gate until the dump body has reached a predetermined angle of tilt relative to the sub-frame.

FRED BISZANTZ.